(12) United States Patent
McLeod

(10) Patent No.: US 9,050,988 B1
(45) Date of Patent: Jun. 9, 2015

(54) COLLAPSIBLE CART

(71) Applicant: Donald B. McLeod, Saskatoon (CA)

(72) Inventor: Donald B. McLeod, Saskatoon (CA)

(*) Notice: Subject to any disclaimer, the term of this patent is extended or adjusted under 35 U.S.C. 154(b) by 0 days.

(21) Appl. No.: 13/959,127

(22) Filed: Aug. 5, 2013

Related U.S. Application Data

(60) Provisional application No. 61/782,960, filed on Mar. 14, 2013.

(51) Int. Cl.
*B62B 3/02* (2006.01)

(52) U.S. Cl.
CPC ..................... *B62B 3/022* (2013.01)

(58) Field of Classification Search
CPC ........ B62B 3/002; B62B 3/005; B62B 3/008; B62B 3/02; B62B 3/022; B62B 3/027
USPC ......... 280/35, 639, 38, 39, 651, 47.34, 79.11, 280/79.2, 79.3
See application file for complete search history.

(56) References Cited

U.S. PATENT DOCUMENTS

| | | | |
|---|---|---|---|
| 2,398,863 A | 4/1946 | Sides | |
| 3,804,432 A * | 4/1974 | Lehrman | 280/654 |
| 4,492,388 A | 1/1985 | de Wit | |
| 5,464,104 A * | 11/1995 | McArthur | 211/133.3 |
| D407,882 S | 4/1999 | Duchene | |
| 5,915,722 A * | 6/1999 | Thrasher et al. | 280/649 |
| D455,243 S | 4/2002 | Walter | |
| 7,168,715 B1 | 1/2007 | Friedman | |
| 7,188,847 B1 | 3/2007 | Friedman | |
| D546,018 S | 7/2007 | Goodell | |
| 7,258,352 B2 | 8/2007 | Odgers | |
| 8,567,809 B2 * | 10/2013 | White et al. | 280/651 |
| 2004/0124598 A1 | 7/2004 | Williams | |
| 2007/0096437 A1* | 5/2007 | Watson | 280/651 |
| 2011/0156375 A1* | 6/2011 | Gal | 280/651 |

* cited by examiner

*Primary Examiner* — John Walters
(74) *Attorney, Agent, or Firm* — Robert C. Montgomery; Montgomery Patent & Design LP

(57) ABSTRACT

A cart including a platform assembly configured to move upon a ground surface, a mast pivotably connected to the platform assembly, the mast being moveable between an upright position and a collapsed position, at least one (1) pair of support arms pivotably connected to the mast, each support arm of the pair of support arms being moveable between a folded position and an unfolded position, and a locking mechanism configured to retain the mast in the upright position and release the mast into the collapsed position, wherein the pair of support arms is configured to support a bin when in the unfolded position.

17 Claims, 10 Drawing Sheets

COLLAPSIBLE CART

RELATED APPLICATIONS

The present invention was first described in and claims the benefit of U.S. Provisional Application No. 61/782,960, filed Mar. 13, 2013, the entire disclosures of which are incorporated herein by reference.

FIELD OF THE INVENTION

The present invention relates generally to carts, and more particularly, to a collapsible cart configured to support at least one (1) removable bin.

BACKGROUND OF THE INVENTION

The average person has several methods of moving many objects of small or large size. Perhaps the most commonly used aid is a cart, such as those used at grocery stores, and the like. However, these carts are typically not available for home use. Additionally, the basket area on most shopping carts is typically large in size, thus making it impractical when trying to move a multitude of small items.

Other assistance means include a wheelbarrow and a hand truck. However, the wheelbarrow does not lend itself to inside use, and is prone to easily tipping over with non-symmetrical loads. The hand truck, although good for heavy loads, only works with one (1) object at a time, and requires the user to balance the load on two (2) wheels.

Accordingly, there exists a need for a means by which multiple smaller objects of various sizes and shapes can be easily moved and stored, without the disadvantages as described above.

SUMMARY OF THE INVENTION

The inventor has recognized the aforementioned inherent problems and lack in the art and observed that there is a need for an apparatus configured to the move cumbersome loads made up of multiple smaller objects. The development of the present invention, which will be described in greater detail herein, substantially departs from conventional solutions to provide an improved collapsible cart and in doing so fulfills this need.

In one (1) embodiment, the disclosed cart can include a platform assembly configured to move upon a ground surface, a mast pivotably connected to the platform assembly, the mast being moveable between an upright position and a collapsed position, at least one pair of support arms pivotably connected to the mast, each support arm of the pair of support arms being moveable between a folded position and an unfolded position, and a locking mechanism configured to retain the mast in the upright position and release the mast into the collapsed position, wherein the pair of support arms is configured to support a bin when in the unfolded position.

In another embodiment, the disclosed cart can include a platform assembly configured to move upon a ground surface, a lower mast assembly pivotably connected to the platform, the lower mast assembly being movable between an upright position substantially perpendicular to the platform and a collapsed position substantially parallel to the platform, an upper mast assembly pivotably connected to the lower mast assembly, the upper mast assembly being movable between an upright position substantially perpendicular to the platform and a collapsed position substantially parallel to the platform, a lower locking mechanism operably engaged between the platform and the lower mast assembly, the lower locking mechanism being configured to retain the lower mast assembly in the upright position and release the lower mast assembly into the collapsed position, an upper locking mechanism operably engaged between the lower mast assembly and the upper mast assembly, the upper locking assembly being configured to retain the upper mast assembly in the upright position and release the upper mast assembly into the collapsed position, at least one pair of support arms pivotably connected to the upper mast assembly, each support arm of the pair of support arms being moveable between a folded position substantially parallel to the upper mast assembly and an unfolded position substantially perpendicular to the upper mast assembly, and at least one (1) bin configured to be supported on the pair of support arms when in the unfolded position.

In yet another embodiment, the disclosed cart can include a frame including a front end and a rear end opposite the front end, a support grate connected to the frame, the support grate extending from proximate the front end to proximate the rear end of the frame, a pair of castors rotatably connected to the frame proximate the front end, a pair of wheels rotatably connected to the frame proximate the rear end, a lower mast assembly including a lower end and an upper end, the lower end of the lower mast assembly being pivotably connected to the frame proximate the rear end, the lower mast assembly being movable between an upright position substantially perpendicular to the frame and a collapsed position substantially parallel to the frame, an upper mast assembly including a lower end and an upper end, the lower end of the upper mast assembly being pivotably connected to the upper end of the lower mast assembly, the upper mast assembly being moveable between an upright position substantially perpendicular to the frame and a collapsed position substantially parallel to the frame, a lower locking mechanism operably engaged between the frame and the lower mast assembly, the lower locking mechanism being configured to retain the lower mast assembly in the upright position and release the lower mast assembly into the collapsed position, an upper locking mechanism operably engaged between the lower mast assembly and the upper mast assembly, the upper locking mechanism being configured to retain the upper mast assembly in the upright position and release the upper mast assembly into the collapsed position, a first pair of support arms pivotably connected to the upper mast assembly proximate the upper end of the upper mast assembly, each support arm of the first pair of support arms being moveable between a folded position substantially parallel to the upper mast assembly and an unfolded position substantially perpendicular to the upper mast assembly, and a second pair of support arms pivotably connected to the upper mast assembly proximate the lower end of the upper mast assembly, each support arm of the second pair of support arms being moveable between a folded position substantially parallel to the upper mast assembly and an unfolded position substantially perpendicular to the upper mast assembly.

Furthermore, the described features and advantages of the disclosed cart can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following

DESCRIPTIVE KEY

Figure 1:
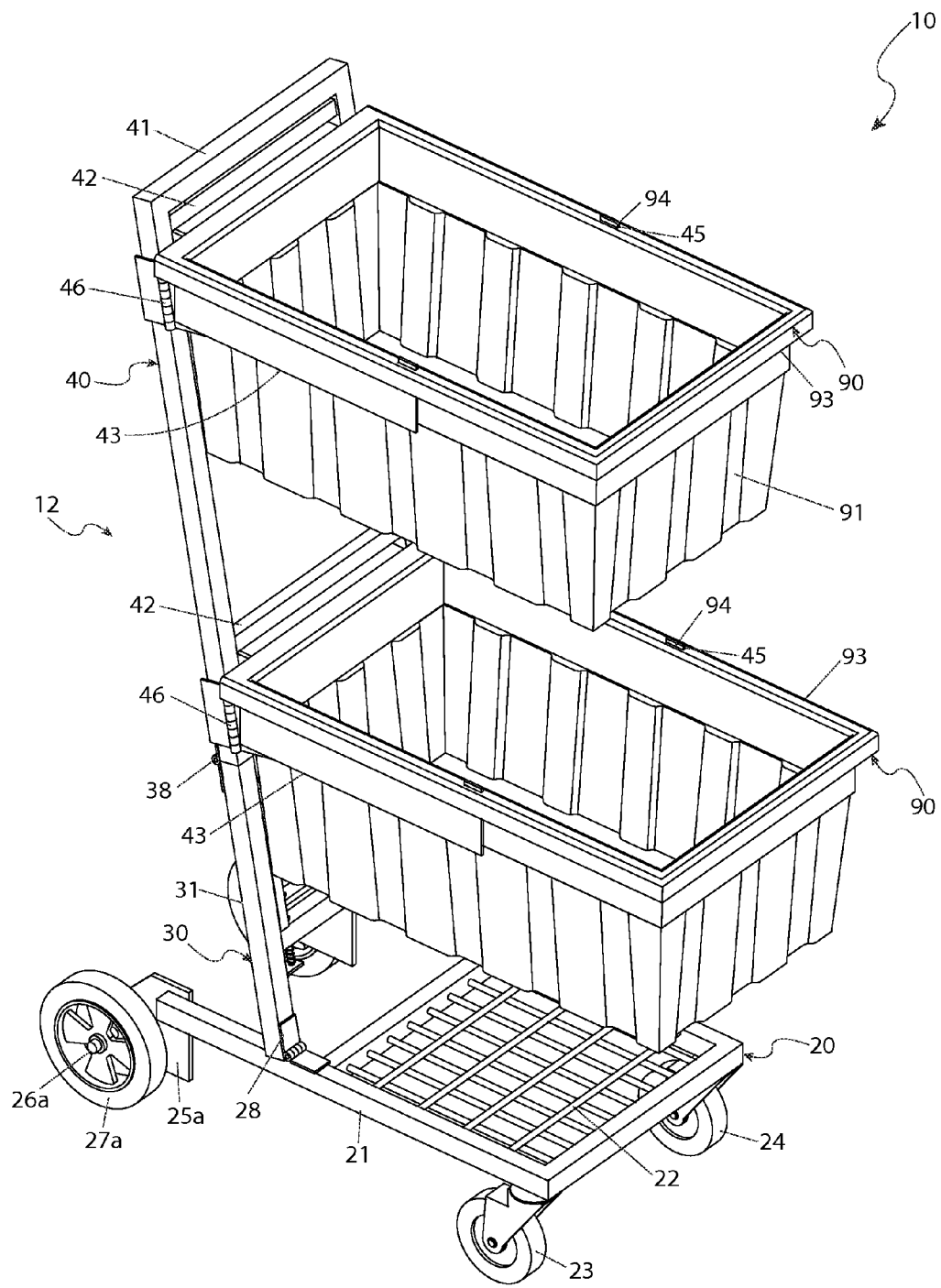
FIG. 1 is a front and side perspective view of the disclosed cart in accordance with one embodiment of the present invention.

- 10 cart
- 12 mast
- 20 platform assembly
- 21 frame
- 22 support grate
- 23 right caster
- 24 left caster
- 25*a* right wheel mounting plate
- 25*b* left wheel mounting plate
- 26*a* right axle
- 26*b* left axle
- 27*a* right rear wheel
- 27*a* left rear wheel
- 28 right mast hinge
- 29 left mast hinge
- 30 lower mast assembly
- 31 right upright
- 32 left upright
- 33 upper crossbar
- 34 upper crossbar aperture
- 35 lower crossbar
- 36 lower crossbar aperture
- 37*a* right mast guide
- 37*b* left mast guide
- 38 right knee hinge
- 39 left knee hinge
- 40 upper mast assembly
- 41 upper mast frame
- 42 upper mast crossbar
- 43 right support arm
- 44 left support arm
- 45 support arm hook
- 46 right support arm hinge
- 47 left support arm hinge
- 50 right mast hinge latch mechanism
- 51 right latch strap
- 52 right mast hinge slide bar
- 53 right mast hinge slotted aperture
- 54 right mast hinge aperture
- 55 slide bar pin
- 56 fastener
- 57 right mast hinge release rod
- 58 spring
- 59 nut
- 60 left mast hinge latch mechanism
- 61 left latch strap
- 62 left mast hinge slide bar
- 63 left mast hinge slide bar slotted aperture
- 64 left mast hinge slide bar aperture
- 65 left mast hinge release rod
- 67 mast hinge release bar
- 68 mast hinge release bar aperture
- 70 right knee hinge latch mechanism
- 71 right mast latch strap
- 72 right knee hinge slide bar
- 73 right knee hinge slotted aperture
- 74 right knee hinge aperture
- 75 right knee hinge release rod
- 76 knee hinge release bar
- 77 knee hinge release bar aperture
- 80 left knee hinge latch mechanism
- 81 left mast latch strap
- 82 left knee hinge slide bar
- 83 left knee hinge slotted aperture
- 84 left knee hinge aperture
- 85 left knee hinge release rod
- 90 bin
- 91 bin sidewall
- 92 bin bottom
- 93 bin lip
- 94 bin lip aperture
- 95 flat lip

DETAILED DESCRIPTION OF THE PREFERRED EMBODIMENT

In accordance with the invention, the best mode is presented in terms of the described embodiments, herein depicted within FIGS. 1 through 8. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring to FIGS. 1-8, disclosing a cart (herein referred to as the "apparatus") 10, where like reference numerals represent similar or like parts. The apparatus 10 is configured to provide for easy and convenient transporting of a variety of items or objects (e.g., canned, bagged, or otherwise packaged goods or products) in a plurality of specialty bins.

The apparatus 10 is provided with a mechanism configured to simultaneously release a plurality of hinge lock mechanisms 50, 60, 70, and 80 to allow an upper mast assembly 40 and a lower mast assembly 30 to fold onto a platform 20 after emptied bins 90 have been removed and support arms 43 and 44 have been folded. While the disclosed apparatus 10 is described herein relating to the accumulation and transportation of foodstuffs, those skilled in the art will appreciated that the disclosed apparatus 10 can find broader applications without limiting scope in any manner.

Figure 2:
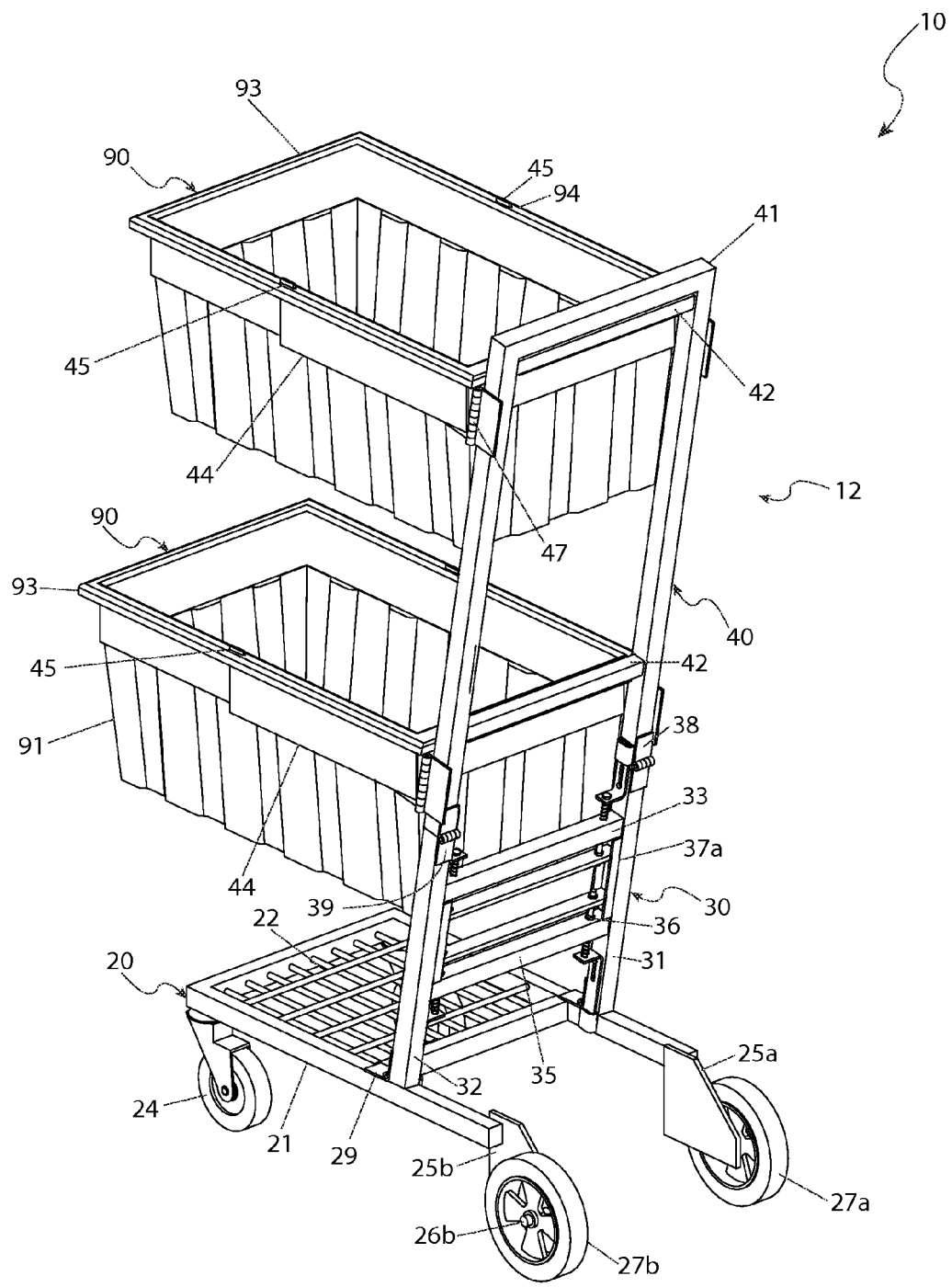
FIG. 2 is a back and side perspective view of the disclosed cart of FIG. 1.

Referring to FIGS. 1 and 2, the platform assembly 20 can include of a frame 21 and a support grate 22. The frame 21 can be made or fabricated of, for example and without limitation, tubular metal or the like having a protective coating or plating to inhibit deterioration. The support grate 22 can be made of, for example and without limitation, a heavy gauge wire with a plurality of layers arranged in a crisscross pattern, expanded sheet metal, or the like. Disposed on the bottom front of the frame 21 is a pair of pivoting casters 23 and 24 which provide steering ability to the apparatus 10.

Affixed to the rear of the frame 21 is a right wheel mounting plate 25a and a left wheel mounting plate 25b. A right axle 26a is affixed to the right wheel mounting plate 25a and a right rear wheel 27a is mounted on the right axle 26a and is secured with a fastening device, such as a cotter pin, a push-on hub, or the like. Similarly, a left axle 26b is affixed to the left wheel mounting plate 25b and a left rear wheel 27b is mounted on the left axle 26b and secured with a fastening device, such as a cotter pin, a push-on hub, or the like.

A mast 12 is attached to the platform assembly 20 at a right mast hinge 28 and a left mast hinge 29. The right mast hinge 28 and the left mast hinge 29 are locked in place during normal operation by a right mast hinge latch mechanism 50 (FIG. 6b) and a left mast hinge latch mechanism 60 (FIG. 5b). The mast 12 can include a lower mast assembly 30 and an upper mast assembly 40. For example, the lower mast assembly 30 can include a right upright 31 and a left upright 32 joined by an upper crossbar 33 and a lower crossbar 35. The lower mast assembly 30 can be made of, for example and without limitation, tubular metal having a protective coating or plating to inhibit deterioration.

Referring to FIG. 5b, disposed upon a left side of the frame 21 of the platform assembly 20, near the location of the left mast hinge 29, is a left latch strap 61 which is a component of the left mast hinge latch mechanism 60. A left mast hinge slide bar 62, which is affixed to a left upright 32 of the lower mast assembly 30 by a slide bar pin 55 projecting through a left mast hinge slotted aperture 63, is engaged into the left latch strap 61 to lock the left mast hinge 29 during normal operation. The left mast hinge slide bar 62 is retained on the slide bar pin 55 by a fastener 56, such as a lock nut threadably engaged to the slide bar pin 55, a snap ring engaged in a groove in the slide bar pin 55, or the like without limitation.

A left mast hinge release rod 65 is inserted upwardly through a left mast hinge aperture 64 in the left mast slide bar 62, progressively through a lower crossbar aperture 36 in the lower crossbar 35, and through a left side mast hinge release bar aperture 68 in the mast hinge release bar 67. The left mast hinge release rod 65 may be, for example and without limitation, a long fastener, with a formed head on one (1) end and a length of threads formed, or cut, for example in Unified Standard, on the opposite end. The left mast hinge release rod 65 is retained on the left end of the mast hinge release bar 67 by a nut 59 positioned on either side (e.g., top and bottom) of the mast hinge release bar 67.

A compression type spring 58 is captured on the left mast hinge release rod 65 between the top of the left mast hinge slide bar 62 and the bottom of the lower crossbar 35. The purpose of this spring 58 is to keep the left mast hinge slide bar 62 positively engaged into the left latch strap 61 thereby locking the hinge action of the left mast hinge 29 until intentionally acted upon by an external force.

Figure 6A:
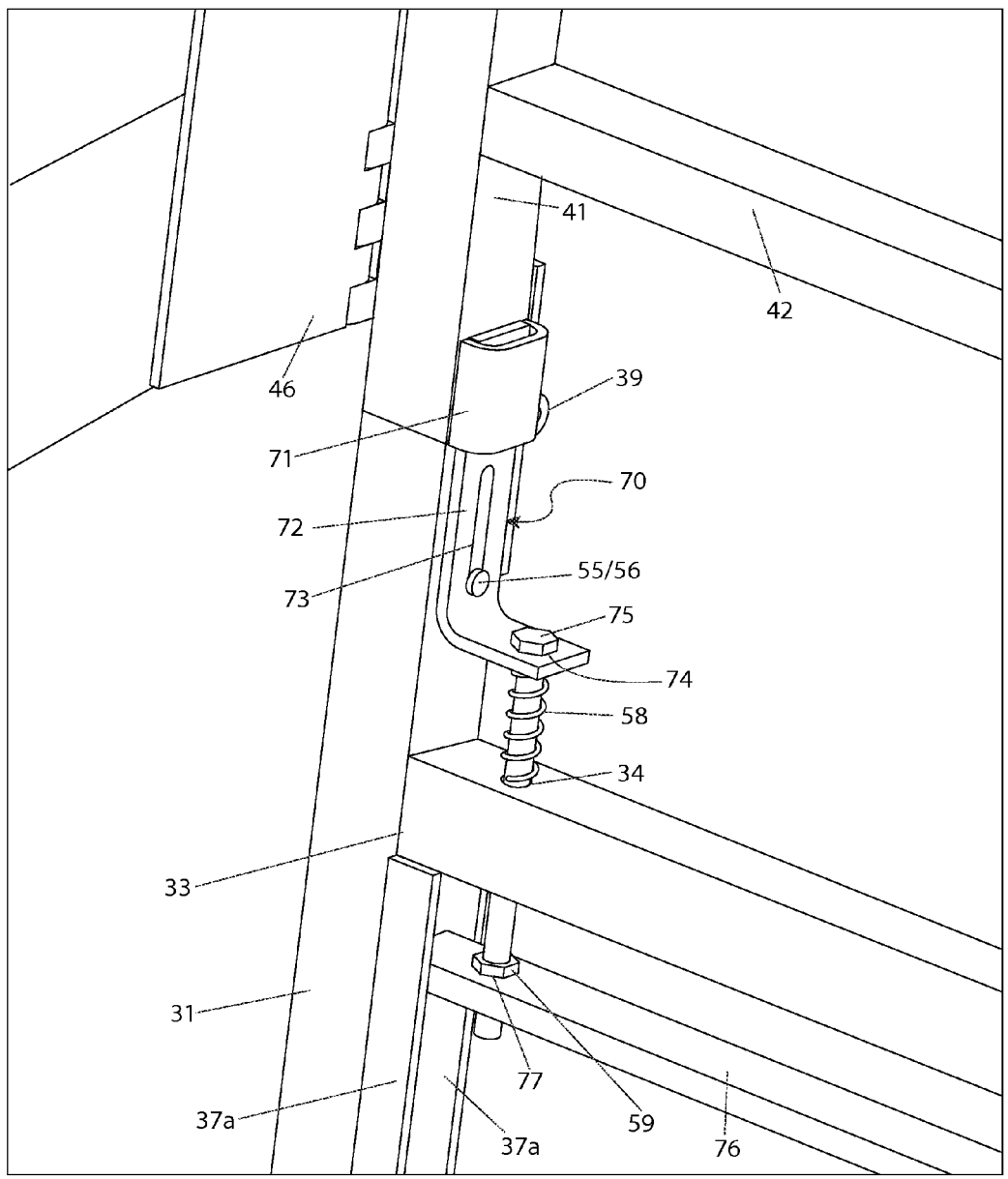
FIG. 6*a* is an enlarged perspective view of a right knee hinge latch mechanism of the disclosed cart.
Figure 6B:
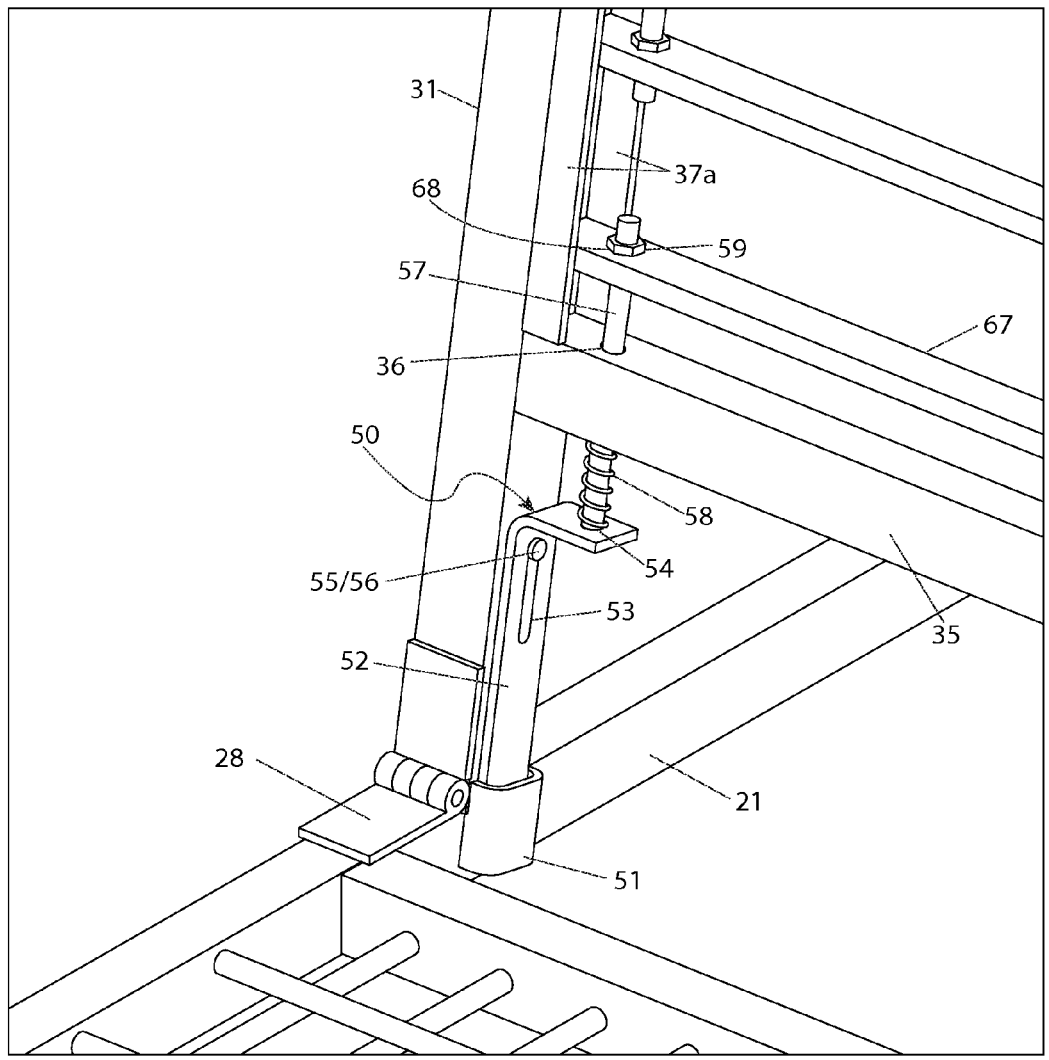
FIG. 6*b* is an enlarged perspective view of a right mast hinge latch mechanism of the disclosed cart.
Figure 7:
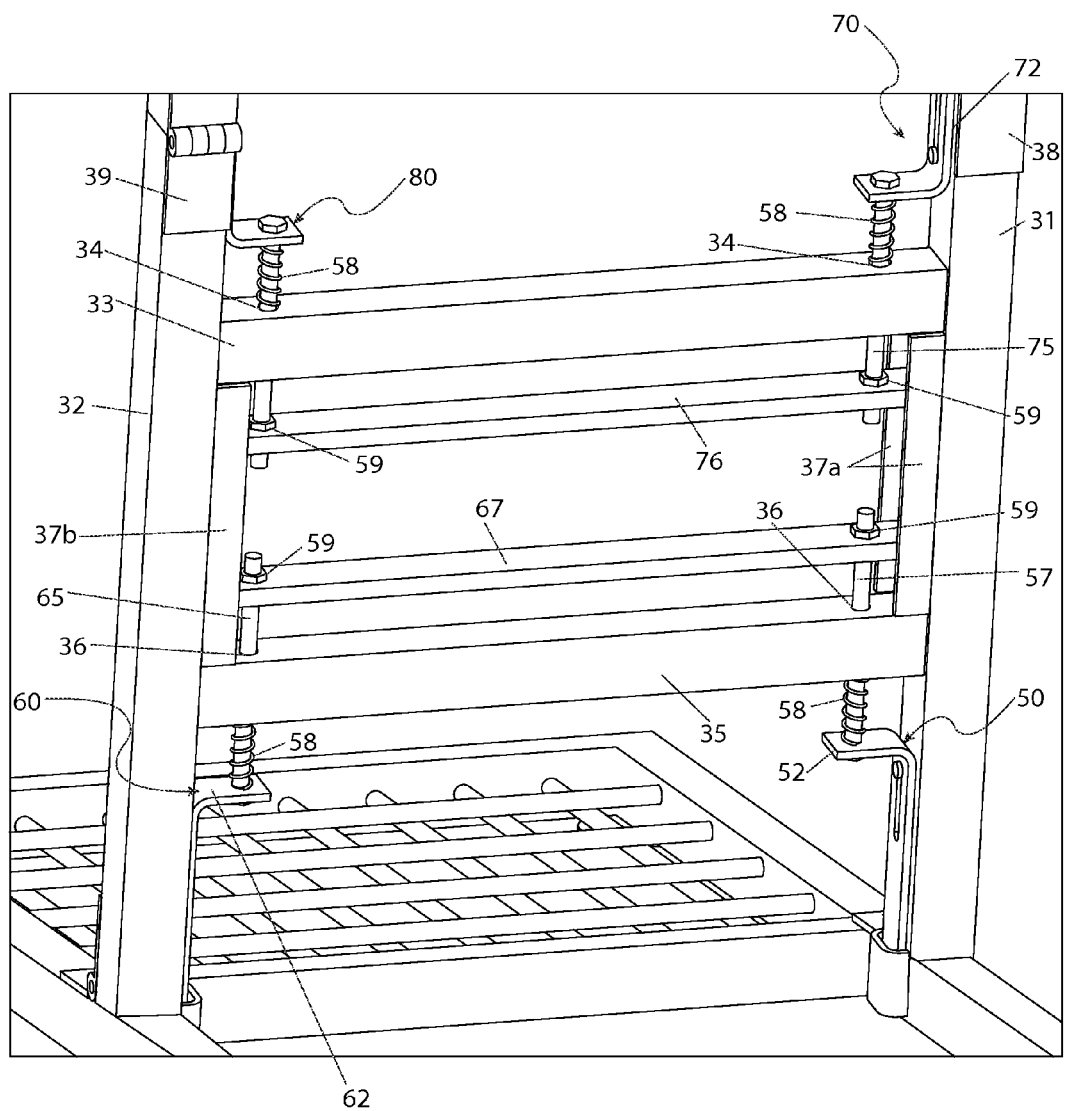
FIG. 7 is an enlarged perspective view of a mast hinge release bar and a knee hinge release bar of the disclosed cart; and, FIG. 8 is a perspective view of the disclosed cart depicted with the bins removed and the mast in a completely collapsed position.

Referring to FIG. 6b, disposed upon a right side of the frame 21 of the platform assembly 20, near the location of the right mast hinge 28, is a right latch strap 51 which is a component of the right mast hinge latch mechanism 50. A right mast hinge slide bar 52, which is affixed to a right upright 31 of the lower mast assembly 30 by a slide bar pin 55 projecting through a right mast hinge slotted aperture 53, is engaged into the right latch strap 51 to lock the right mast hinge 28 during normal operation. The right mast hinge slide bar 52 is retained on the slide bar pin 55 by a fastener 56.

A right mast hinge release rod 57 is inserted upwardly through a right mast hinge aperture 54 in the right mast slide bar 52, progressively through a right side of a lower crossbar aperture 36 (e.g., a through-hole or set of aligned apertures) in the lower crossbar 35, and through a right side mast hinge release bar aperture 68 (e.g., a through-hole or set of aligned apertures) in the mast hinge release bar 67. The right mast hinge release rod 57 has a formed head on one (1) end and a length of threads formed, or cut, for example in Unified Standard, on the opposite end. The right mast hinge release rod 57 is retained on the right end of the mast hinge release bar 67 by a nut 59 positioned on either side of the mast hinge release bar 67.

A compression type spring 58 is captured on the right mast hinge release rod 57 between the top of the right mast hinge slide bar 52 and the bottom of the lower crossbar 35. The purpose of this spring 58 is to keep the right mast hinge slide bar 62 positively engaged into the right latch strap 51 thereby locking the hinge action of the right mast hinge 28 until intentionally acted upon by an external force.

Right mast guides 37a and left mast guides 37b can be plates secured to the right upright 31 and the left upright 32, respectively, of the lower mast assembly 30. The purpose of the right mast guides 37a and the left mast guides 37b is to keep the path of travel of the mast hinge release bar 67 and the knee hinge release bar 76 in line with a longitudinal axis of the lower mast assembly 30.

Figure 5A:
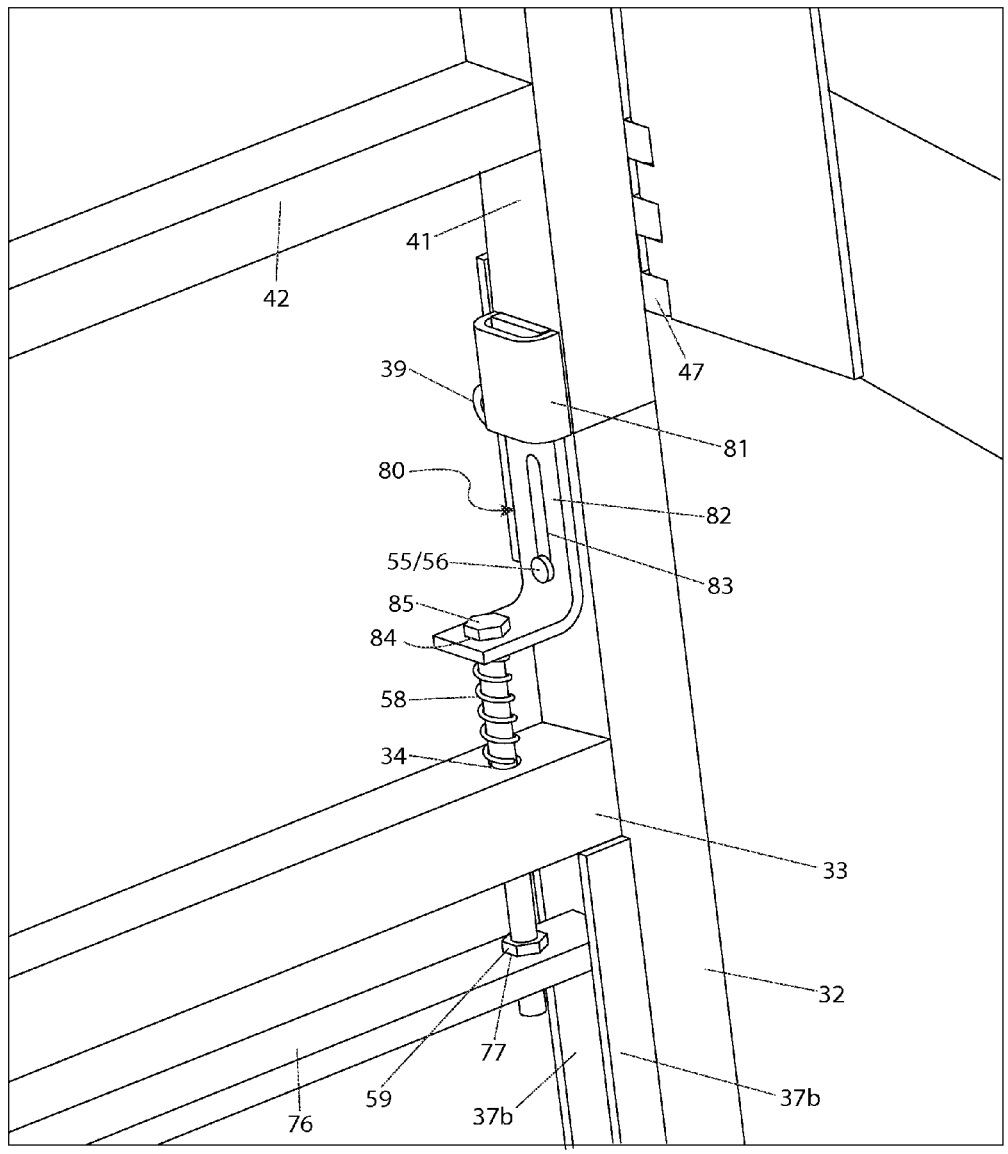
FIG. 5*a* is an enlarged perspective view of a left knee hinge latch mechanism of the disclosed cart.
Figure 5B:
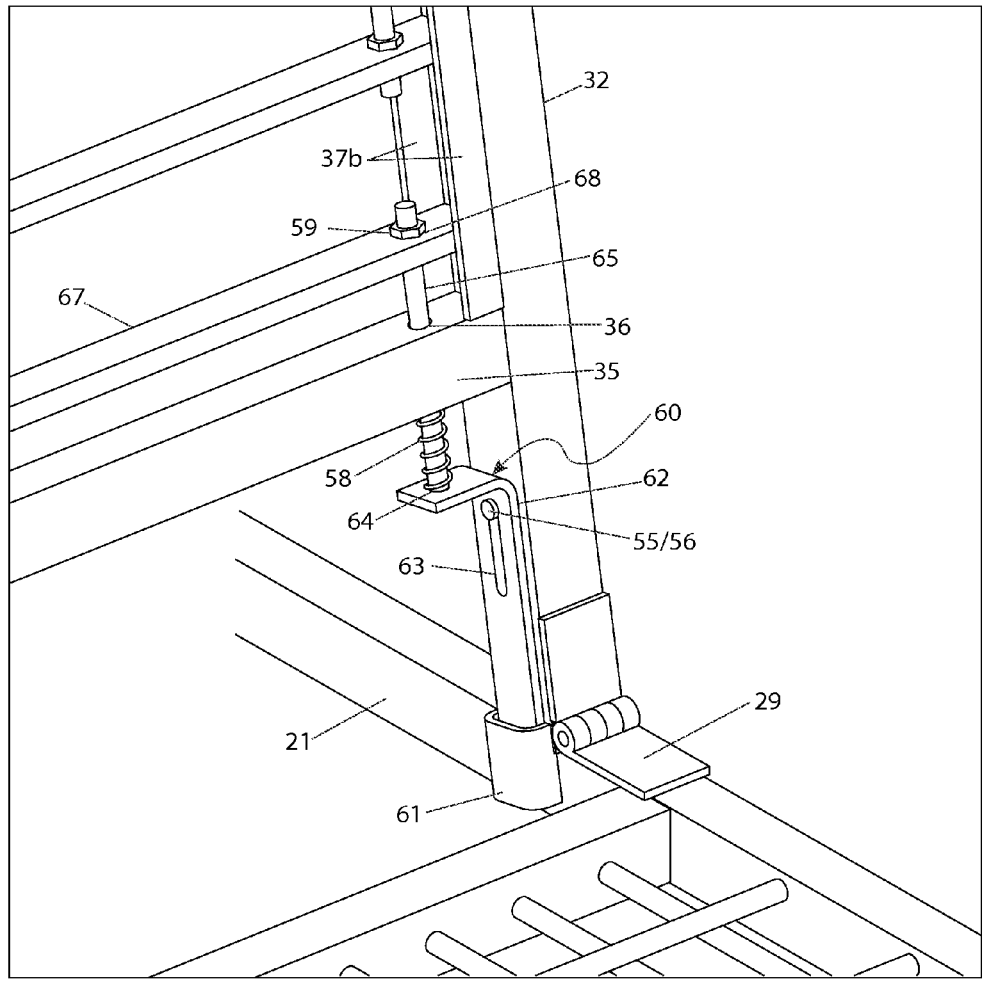
FIG. 5*b* is an enlarged perspective view of a left mast hinge latch mechanism of the disclosed cart.

Referring to FIGS. 5a and 6a, disposed at a top rear side of the right upright 31 of the lower mast assembly 30 is a leaf of the right knee hinge 38. Correspondingly disposed at a top rear side of the left upright 32 of the lower mast assembly 30 is a leaf of the left knee hinge 39. The right knee hinge 38 and the left knee hinge 39 permit a pivoting action between the upper mast assembly 40 and the lower mast assembly 30 during the collapse of the apparatus 10. The right knee hinge 38 and the left knee hinge 39 are locked in place during normal operation by a right knee hinge latch mechanism 70 (FIG. 6a) and the left knee hinge latch mechanism 80 (FIG. 5a), respectively.

Referring to FIG. 6a, the upper mast assembly 40 can be made of, for example and without limitation, tubular metal having a protective coating or plating to inhibit deterioration. For example, the upper mast assembly 40 can include an upper mast frame 41 and two (2) upper mast crossbars 42. Disposed upon the inside of the right side tube of the upper mast frame 41 is a right mast latch strap 71, which is a component of the right knee hinge latch mechanism 70. The right knee hinge slide bar 72, which is affixed to the inside of right upright 31 of the lower mast assembly 30 by a slide bar pin 55 projecting through a right knee hinge slotted aperture 73, is engaged into the right mast latch strap 71 to lock the right knee hinge 38 during normal operation. The right knee hinge slide bar 72 is retained on the slide bar pin 55 by a fastener 56, such as a lock nut engaged in threads on the slide bar pin 55, a snap ring engaged in a groove in the slide bar pin 55, or the like without limitation.

A right knee hinge release rod 75 is inserted downwardly through a right knee hinge aperture 74 in the right knee hinge slide bar 72, progressively through a right side upper crossbar aperture 34 (e.g., a through-hole or set of aligned apertures) in the upper crossbar 33, and through a right side knee hinge release bar aperture 77 in the knee hinge release bar 76. The right knee hinge release rod 75 has a formed head on one (1) end and a length of threads formed, or cut, for example in Unified Standard, on the opposite end. The right knee hinge release rod 75 is retained on the right end of the knee hinge release bar 76 by a nut 59 positioned on either side of the knee hinge release bar 76.

A compression type spring 58 is captured on the right knee hinge release rod 75 between the bottom of the right knee hinge slide bar 72 and the top of the upper crossbar 33. The purpose of this spring 58 is to keep the right knee hinge slide bar 72 positively engaged into the right mast latch strap 71 thereby locking the hinge action of the right knee hinge 38 until intentionally acted upon by an external force.

Referring to FIG. 5a, disposed upon the inside of a left side tube of the upper mast frame 41 is a left mast latch strap 81 which is a component of the left knee hinge latch mechanism 80. The left knee hinge slide bar 82, which is affixed to the inside of left upright 32 of the lower mast assembly 30 by a slide bar pin 55 projecting through the left knee hinge slotted aperture 83, is engaged into the left mast latch strap 81 to lock the left knee hinge 39 during normal operation. The left knee hinge slide bar 82 is retained on the slide bar pin 55 by a fastener 56.

A left knee hinge release rod 85 is inserted downwardly through the left knee hinge aperture 84 in the left knee hinge slide bar 22, progressively through a left side upper crossbar aperture 34 in the upper crossbar 33, and through the left side knee hinge release bar aperture 77 in the knee hinge release bar 76. The left knee hinge release rod 85 has a formed head on one (1) end and a length of threads formed, or cut, for example in Unified Standard, on the opposite end. The left knee hinge release rod 85 is retained on the left end of the knee hinge release bar 76 by a nut 59 positioned on either side of the knee hinge release bar 76.

A compression type spring 58 is captured on the left knee hinge release rod 85 between the bottom of the left knee hinge slide bar 82 and the top of the upper crossbar 33. The purpose of this spring 58 is to keep the left knee hinge slide bar 82 positively engaged into the left mast latch strap 81 thereby locking the hinge action of the left knee hinge 39 until intentionally acted upon by an external force.

Referring again to FIG. 2, a plurality of left support arm hinges 47 is uniformly disposed upon the outside of the left side of the upper mast frame 41. These left support hinges 47 have one (1) leaf of each hinge permanently affixed to the upper mast frame 41 in such a manner as to keep the hinge pin of each left support hinge 47 parallel to, and to the front and outside of, the upper mast frame 41. When the unrestrained leaf of each left support arm hinge 47 is folded over upon the upper mast frame 41, each unrestrained leaf will be parallel to, and in contact with, the front of the upper mast frame 41.

A left support arm 44 will be permanently affixed to the outside of the unrestrained leaf of each left support arm hinge 47 in such a manner as to keep the left support arm 44 parallel to the platform assembly 20 when the left support arm 44 is perpendicular to the upper mast frame 41 with a support arm hook 45 oriented at the top of the left support arm 44. The placement of the left support arm 44 on the left support arm hinge 47 will preferably be such that the left support arm hinge 47 will not open to more than a "lay flat" position (e.g., a 180° angle).

Referring again to FIG. 1, a plurality of right support arm hinges 46 is uniformly disposed upon the outside of the right side of the upper mast frame 41 at a location corresponding to left support arms 44. These right support hinges 46 have one (1) leaf of each hinge permanently affixed to the upper mast frame 41 in such a manner as to keep the hinge pin of each right support hinge 46 parallel to, and to the front and outside of, the upper mast frame 41. The fixed leaf of the right support hinge 46 will preferably be constructed such that the hinge pin will be spaced away from upper mast frame 41 a distance equivalent to the combined thickness of the left support arm 44 and the leaf of the left arm support hinge 47. When the unrestrained leaf of each right support arm hinge 46 is folded over ninety degrees (90°) toward the upper mast frame 41, each unrestrained leaf will be parallel to the front of the upper mast frame 41.

A right support arm 43 will be permanently affixed to the outside of the unrestrained leaf of each right support arm hinge 46 in such a manner as to keep the right support arm 43 parallel to the platform assembly 20 when the right support arm 43 is perpendicular to the upper mast frame 41 with the support arm hook 45 oriented at the top of the right support arm 43. The placement of the right support arm 43 on the right support arm hinge 46 will preferably be such that the right support arm hinge 46 will not open to more than the "lay flat" position (e.g., a 180° angle). The right support arm 43 will preferably be fabricated such that the support arm hooks 45 of each corresponding pair of right support arm 43 and left support arm 44 will be equidistant from the upper mast frame 41.

Referring to FIGS. 1 and 2, a specialty bin 90 can be suspended from each pair of right support arm 42 and left support arm 43. The bin 90 can be made of any suitably durable material, for example a formed thermoplastic material, a composite or other suitable material. The bin 90 can generally rectangular including a plurality of bin sidewalls 91 joined along vertical edges, an integral bin bottom 92, and a bin lip 93 disposed on at least two (2) opposing sides and conjoined along a common side.

The bin lip 93 around three (3) joined sides can include a narrow horizontal planar surface integrally formed at the upper edge of the sidewalls 91 in combination with an integrally formed vertical planar surface. This fold-over configuration results in an increase in the moment of inertia of the cross-section and thereby increases the structural strength of the sidewalls 93.

Figure 3:
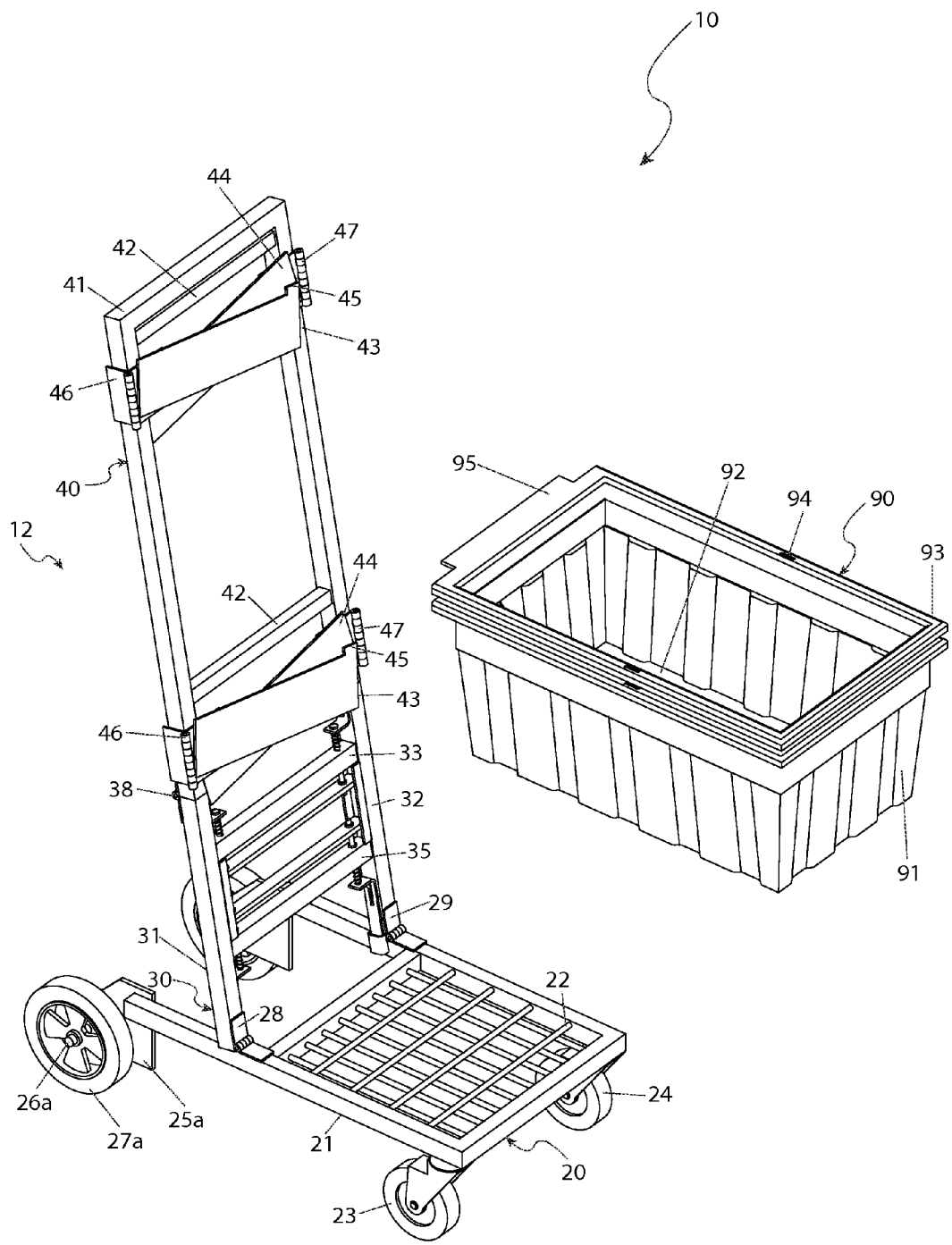
FIG. 3 is a perspective view of the disclosed cart depicted with the bins removed and the right support arms and the left support arms in a folded position.

Referring to FIG. 3, provided on the remaining side of the bin 90 is a flat lip 95 which can include a centrally located extension of a portion of the horizontal planar surface integrally formed at the upper edge of the fourth sidewall 91. The flat lip 95 is preferably oriented toward the mast 12 of the apparatus 10 and is configured to fit within the upper mast frame 41.

The bin 90 also includes a bin lip aperture 94 disposed in the bin lip 93 of opposing sides to accommodate (e.g., receive) the support arm hook 45 of the corresponding right support arm 43 and the left support arm 44. The bin lip apertures 94 can be located such that when the bin 90 is suspended from the right support arm 43 and left support arm 44, the flat lip 95 of the bin 90 will fit under the corresponding upper mast crossbar 42 of the upper mast frame 41. Those skilled in the art will recognize that the bin 90 may be configured in any color or depth, with or without reinforcement gussets, stiffening folds, or any such structural modifications without limiting the scope of the present disclosure.

Referring still to FIG. 3, the bins 90 are completely removable from the apparatus 10 without the need to make any adjustments. The bins 90 may be removed while empty or, with additional physical exertion, while items are still in the bins 90. The removal of the bins 90 is preparatory to collapsing the mast 12. Those skilled in the art will appreciate that the apparatus 10 may be alternately configured with a locking brake (not shown) on one (1) or both of the right caster 23 or left caster 24, if desired, thereby providing a restriction to mobility to perform the aforementioned task or to keep the apparatus 10 from moving on a slope.

In an example implementation, the left support arms 44 are folded against the upper mast frame 41 by pivoting the left support arm hinges 47 prior to folding the right support arms 43 against the left support arms 44 by pivoting the right support arm hinges 46. Those skilled in the art will appreciate that the example implementation is not meant to be viewed as a structural limitation or a specific defining point and could be reversed by modifying the construction of the right support arm 43, the right support arm hinge 46, left support arm 44, and the left support arm hinge 47 without limiting the scope of the apparatus 10.

Referring to FIGS. 3, 4, 7, and 8, the procedure for collapsing the apparatus 10 for storage, or conveyance in a vehicle, would be to remove the bins 90 from the apparatus 10; fold the left support arms 44 against the upper mast frame 41 (FIG. 3); fold the right support arms 43 against the left support arms 44; and while supporting the mast 12 with one (1) hand to relieve any preload on the hinge latch mechanisms 50, 60, 70, and 80, grasp the mast hinge release bar 67 and the knee hinge release bar 76 simultaneously (FIG. 7) and force the mast hinge release bar 67 toward the knee hinge release bar 76.

Figure 4:
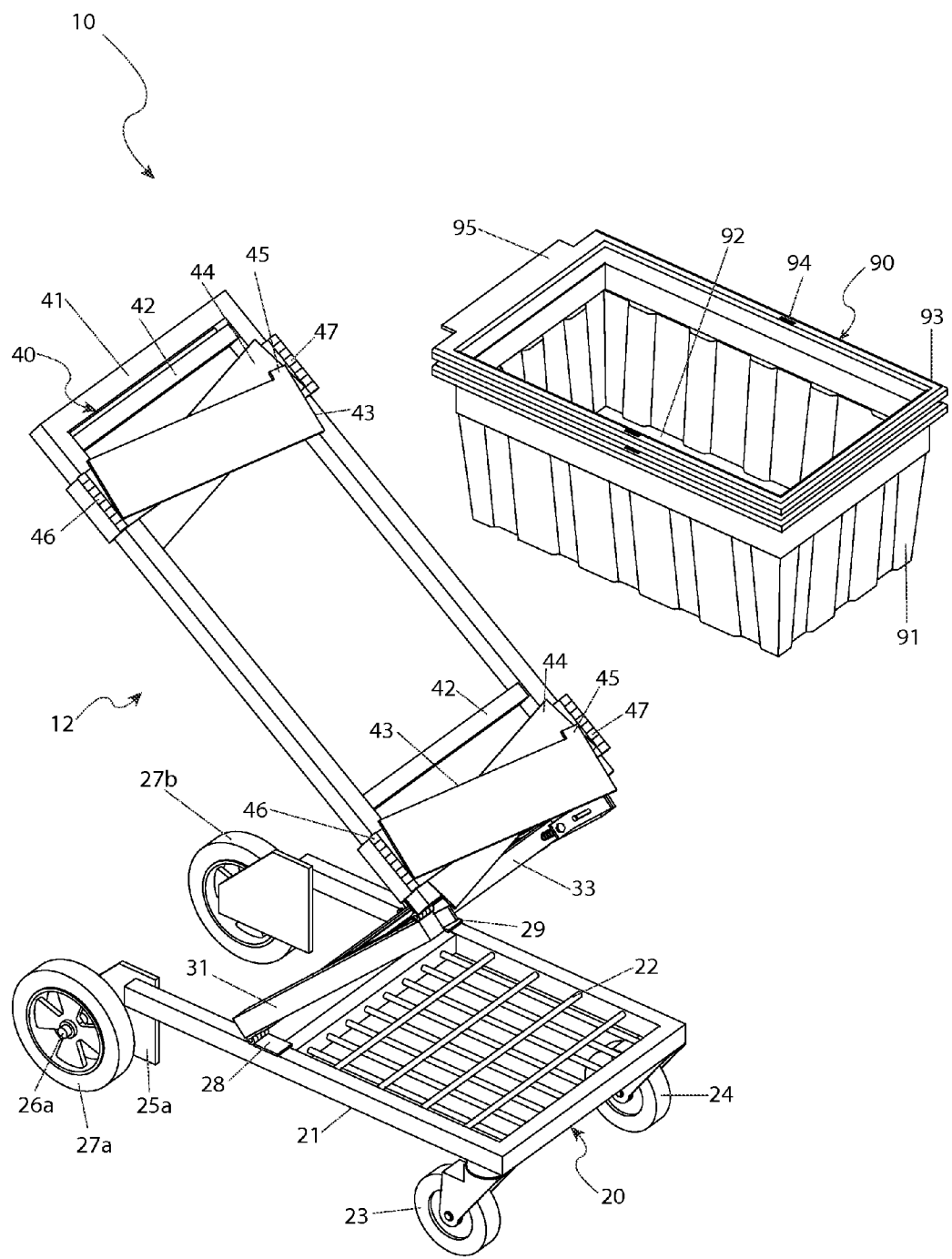
FIG. 4 is a perspective view of the disclosed cart depicted with the bins removed and the mast in a partially collapsed position.
Figure 8:
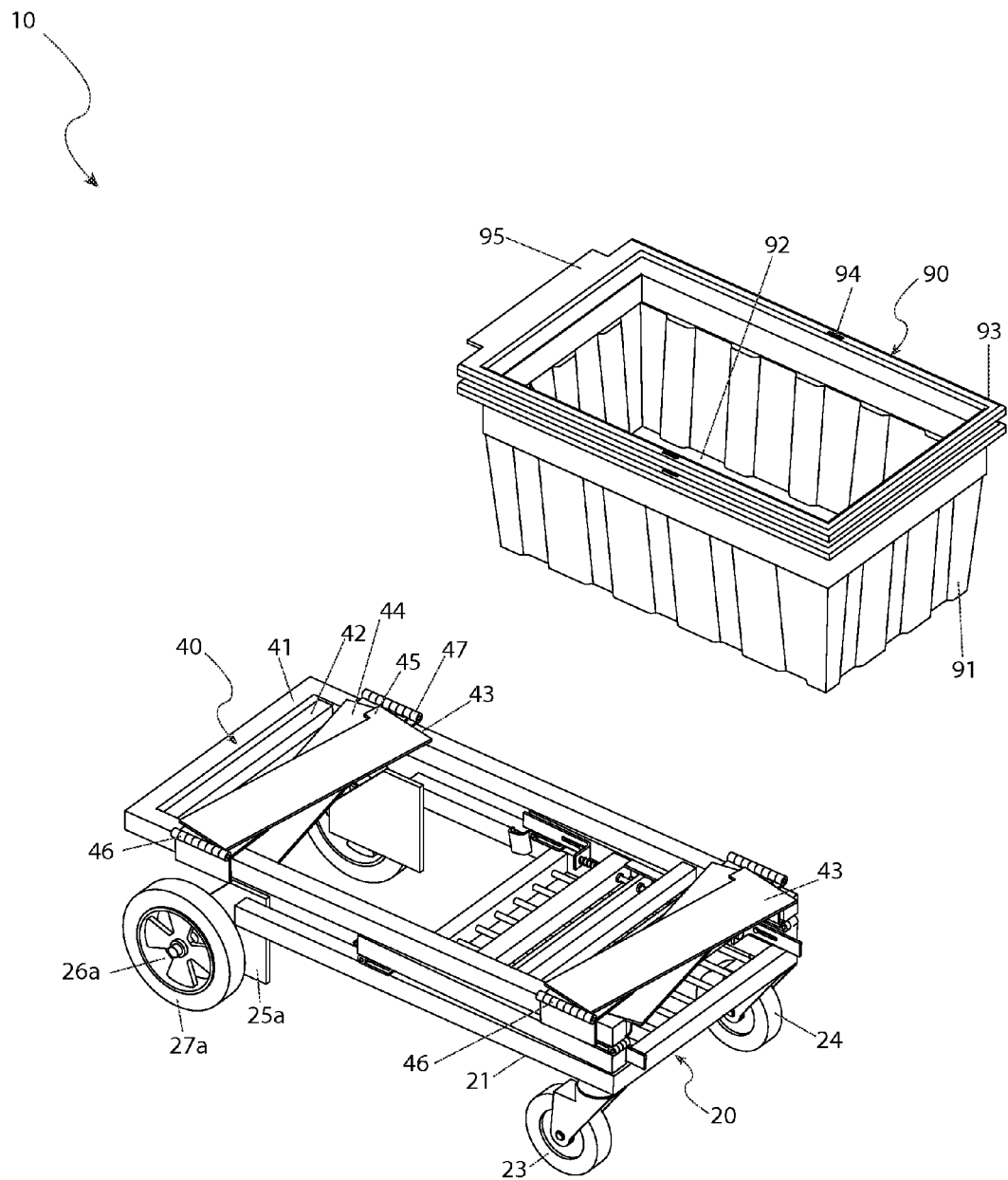

The mast hinge release bar 67 and the knee hinge release bar 76 will travel within the right mast guides 37a and the left mast guides 37b to pull simultaneously on all of the right mast hinge release rod 57, the left mast hinge release rod 65, the right knee hinge release rod 75, and the left knee hinge release rod 85; thereby compressing all of the springs 58 and retracting, respectively, the right mast slide bar 52 from the right latch strap 51, left mast slide bar 62 from the left latch strap 61 the right knee hinge slide bar 72 from the right mast latch strap 71, and the left knee hinge slide bar 82 from the left mast latch strap 81; removing all impediment to the normal pivoting function of the right mast hinge 28, the left mast hinge 29, the right knee hinge 38, and the left knee hinge 39; and permitting the lower mast assembly 30 to fold and collapse forward upon the platform assembly 20, while the upper mast assembly 40 folds toward the rear, and collapses upon the lower mast assembly 30 (FIG. 4 and FIG. 8).

An alternate configuration of the apparatus 10 would involve a clasp mechanism (not shown) to hold the mast hinge release bar 67 in proximity to the knee hinge release bar 76 after the release of the right mast hinge release mechanism 50, the left mast hinge release mechanism 60, the right knee hinge release mechanism 70, and the left knee hinge release mechanism 80 thereby freeing one (1) hand from this task while collapsing the mast 12 of the apparatus 10.

It is envisioned that other styles and configurations of the disclosed apparatus 10 can be easily incorporated into the teachings of the present disclosure, and only certain particular configurations have been shown and described for purposes of clarity and disclosure and not by way of limitation of scope.

In an example implementation, the example embodiment of the apparatus 10 can be utilized by a user in a simple and straightforward manner with little or no training. Upon initial purchase or acquisition, the apparatus 10 would very likely be configured as illustrated in FIG. 8. In order to properly use the apparatus 10 it would be necessary to reconfigure the apparatus 10, as shown in FIG. 1, by partially raising the upper mast assembly 40 to gain free access to the mast hinge release bar 67 and the knee hinge release bar 76.

While supporting the upper mast assembly 40 with one (1) hand, the mast hinge release bar 67 and the knee hinge release bar 76 can be forced (e.g., simultaneously) toward the knee hinge release bar 76 thereby releasing the right mast hinge release mechanism 50, the left mast hinge release mechanism 60, the right knee hinge release mechanism 70, and the left knee hinge release mechanism 80, and removing any impediment to the free motion of the right mast hinge 29, the left mast hinge 29, the right knee hinge 38, and the left knee hinge 39. The upper mast assembly 40 can be lifted, unfolding the mast assembly 12 until the upper mast assembly 40 is in alignment with the lower mast assembly 30, and the right mast hinge 28 has opened sufficiently for the bottom of the right upright 31 of the lower mast assembly 30 to contact the frame 21 of the platform assembly 20.

The mast hinge release bar 67 and the knee hinge release bar 76 can be released to allow the springs 58 to push simultaneously on all of the right mast hinge release rod 57, the left mast hinge release rod 65, the right knee hinge release rod 75, and the left knee hinge release rod 85; thereby extending, respectively, the right mast slide bar 52 into the right latch strap 51, left mast slide bar 62 into the left latch strap 61 the right knee hinge slide bar 72 into the right mast latch strap 71, and the left knee hinge slide bar 82 into the left mast latch strap 81, and impeding the normal pivoting function of the right mast hinge 28, the left mast hinge 29, the right knee hinge 38, and the left knee hinge 39.

The right support arms 43 can be unfolded by pivoting the right support arm hinges 46 until the right support arms 43 are positioned perpendicular to the upper mast assembly 40. The left support arms 44 can be unfolded by pivoting the left support hinges 47 until the left support arms 44 are perpendicular to the upper mast assembly 40. One or more bins 90 can be installed onto a set of right support arm 43 and left support arm 44 by sliding the flat lip 95 of the bin 90 under the upper mast crossbar 42 in proximity to the corresponding set of right support arm 43 and left support arm 44; engaging the support arm hook 45 of each right support arm 43 and left support arm 44 into the bin lip apertures 94 of the respective bin 90.

Having thus configured the apparatus 10 as shown in FIG. 1, the user may now place the desired items and/or packages into the bins 90, or place the items or packages upon the support grate 22 of the platform assembly 20 for transport to a checkout station or to the desired destination. The apparatus 10 may be stored or conveyed in a vehicle by collapsing said apparatus 10 according to the preferred embodiment.

The foregoing embodiments of the disclosed cart have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. A cart comprising:
    a platform assembly configured to move upon a ground surface;
    a mast pivotably connected to said platform assembly, said mast being moveable between an upright position and a collapsed position;
    at least one pair of support arms pivotally connected to said mast, each support arm of said pair of support arms being moveable between a folded position and an unfolded position; and,
    a locking mechanism configured to retain said mast in said upright position and release said mast into said collapsed position, comprising:
        a plurality of slide bars operably engaged between said platform assembly and said mast, said plurality of slide bars being movable between an engaged position and a disengaged position, said plurality of slide bars being biased in said engaged position to retain said mast in said upright position; and,
        at least one release bar connected to said plurality of slide bars, said release bar being movable to position said plurality of slide bars in said disengaged position to release said mast into said collapsed position;
    wherein said pair of support arms is configured to support a bin when in said unfolded position.

2. The cart of claim 1, wherein said platform comprises:
    a frame;
    a support grate connected to said frame; and,
    a plurality of wheels rotatably connected to said frame.

3. The cart of claim 1, wherein said mast comprises:
    a lower mast assembly pivotably connected to said platform, said lower mast assembly being substantially perpendicular to said platform when in said upright position and substantially parallel to said platform when in said collapsed position; and,
    an upper mast assembly pivotably connected to said lower mast assembly, said upper mast assembly being substantially perpendicular to said platform when in said upright position and substantially parallel to said platform when in said collapsed position.

4. The cart of claim 3, wherein said locking mechanism comprises:
    a lower locking mechanism operably engaged between said platform and said lower mast assembly, said lower locking mechanism being configured to retain said lower mast assembly in said upright position and release said lower mast assembly into said collapsed position; and,
    an upper locking mechanism operably engaged between said lower mast assembly and said upper mast assembly, said upper locking assembly being configured to retain said upper mast assembly in said upright position and release said upper mast assembly into said collapsed position.

5. The cart of claim 4, wherein said lower locking assembly comprises:
    at least two lower slide bars operably connected to said platform and said lower mast assembly, said lower slide bars being movable between an engaged position and a disengaged position, said lower slide bars being biased in said engaged position to retain said lower mast assembly in said upright position; and,
    at least one lower release bar connected to said lower slide bars, said lower release bar being moveable to position said lower slide bars in said disengaged position to release said lower mast assembly into said collapsed position.

6. The cart of claim 4, wherein said upper locking assembly comprises:
    at least two upper slide bars operably connected to said lower mast assembly and said upper mast assembly, said upper slide bars being movable between an engaged position and a disengaged position, said upper slide bars being biased in said engaged position to retain said lower mast assembly in said upright position; and,
    at least one upper release bar connected to said upper slide bars, said upper release bar being moveable to position said upper slide bars in said disengaged position to release said upper mast assembly into said collapsed position.

7. The cart of claim 3, wherein said pair of support arms is pivotably connected to said upper mast assembly; and wherein each arm of said pair of support arms is substantially parallel to said upper mast assembly when in said folded position and substantially perpendicular to said upper mast assembly when in said unfolded position.

8. A cart comprising:
    a platform assembly configured to move upon a ground surface;
    a lower mast assembly pivotably connected to said platform assembly, said lower mast assembly being movable between an upright position substantially perpendicular to said platform and a collapsed position substantially parallel to said platform;
    an upper mast assembly pivotably connected to said lower mast assembly, said upper mast assembly being movable between an upright position substantially perpendicular to said platform and a collapsed position substantially parallel to said platform;
    a lower locking mechanism operably engaged between said platform and said lower mast assembly, said lower locking mechanism being configured to retain said lower mast assembly in said upright position and release said lower mast assembly into said collapsed position;
    an upper locking mechanism operably engaged between said lower mast assembly and said upper mast assembly, said upper locking assembly being configured to retain said upper mast assembly in said upright position and release said upper mast assembly into said collapsed position;

at least one pair of support arms pivotably connected to said upper mast assembly, each support arm of said pair of support arms being moveable between a folded position substantially parallel to said upper mast assembly and an unfolded position substantially perpendicular to said upper mast assembly; and, at least one bin configured to be supported on said pair of support arms when in said unfolded position;

wherein said lower mast assembly comprises a lower mast frame comprising a lower end pivotably connected to said platform assembly and an upper end opposite said lower end;

wherein said upper mast assembly comprises an upper mast frame comprising a lower end pivotably connected to said lower end of said lower mast frame and an upper end opposite said lower end; and, wherein said lower locking mechanism comprises a pair of lower slide bars movably connected to said lower mast frame proximate said lower end of said lower mast frame, said lower slide bars being movable between an engaged position and a disengaged position, said lower slide bars being operably connected to said platform when in said engaged position, and said lower slide bars being biased in said engaged position to retain said lower mast assembly in said upright position.

9. The cart of claim 8, wherein said lower locking mechanism comprises a lower release bar connected to said lower slide bars, said lower release bar being moveable to position said lower slide bars in said disengaged position to release said lower mast assembly into said collapsed position.

10. The cart of claim 8, wherein said upper locking mechanism comprises a pair of upper slide bars moveably connected to said lower mast frame proximate said upper end of said lower mast frame, said upper slide bars being moveable between an engaged position and a disengaged position, said upper slide bars being operably connected to said upper mast frame when in said engaged position, and said upper slide bars being biased in said engaged position to retain said upper mast assembly in said upright position.

11. The cart of claim 10, wherein said upper locking mechanism comprises an upper release bar connected to said upper slide bars, said upper release bar being moveable to position said upper slide bars in said disengaged position to release said upper mast assembly into said collapsed position.

12. A cart comprising:
a frame comprising a front end and a rear end opposite said front end;
a support grate connected to said frame, said support grate extending from proximate said front end to proximate said rear end of said frame;
a pair of castors rotatably connected to said frame proximate said front end;
a pair of wheels rotatably connected to said frame proximate said rear end;
a lower mast assembly comprising a lower end and an upper end, said lower end of said lower mast assembly being pivotably connected to said frame proximate said rear end, said lower mast assembly being movable between an upright position substantially perpendicular to said frame and a collapsed position substantially parallel to said frame;
an upper mast assembly comprising a lower end and an upper end, said lower end of said upper mast assembly being pivotably connected to said upper end of said lower mast assembly, said upper mast assembly being moveable between an upright position substantially perpendicular to said frame and a collapsed position substantially parallel to said frame;
a lower locking mechanism operably engaged between said frame and said lower mast assembly, said lower locking mechanism being configured to retain said lower mast assembly in said upright position and release said lower mast assembly into said collapsed position;
an upper locking mechanism operably engaged between said lower mast assembly and said upper mast assembly, said upper locking mechanism being configured to retain said upper mast assembly in said upright position and release said upper mast assembly into said collapsed position;
a first pair of support arms pivotably connected to said upper mast assembly proximate said upper end of said upper mast assembly, each support arm of said first pair of support arms being moveable between a folded position substantially parallel to said upper mast assembly and an unfolded position substantially perpendicular to said upper mast assembly; and,
a second pair of support arms pivotably connected to said upper mast assembly proximate said lower end of said upper mast assembly, each support arm of said second pair of support arms being moveable between a folded position substantially parallel to said upper mast assembly and an unfolded position substantially perpendicular to said upper mast assembly.

13. The cart of claim 12, wherein:
said lower mast assembly comprises:
a first upright frame member and a second upright frame member spaced apart from and substantially parallel to said first upright frame member, said first and second upright members each comprising a lower end pivotably connected to said frame and an upper end;
an upper crossbar member connected to and spanning between said first and second upright members proximate said upper end of said lower mast assembly; and,
a lower crossbar member connected to and spanning between said first and second upright members proximate said lower end of said lower mast assembly; and,
said upper mast assembly comprises:
a first upright frame member and a second upright frame member spaced apart from and substantially parallel to said first upright frame member, said first and second upright members each comprising a lower end pivotably connected to said upper end of said first and second upright members of said lower mast assembly and an upper end; and,
at least one crossbar member connected to and spanning between said first and second upright members of said upper mast assembly.

14. The cart of claim 13, wherein said lower locking mechanism comprises:
a pair of opposed lower latch straps connected to said frame;
a pair of opposed lower slide bars moveably connected to said first and second upright frame members proximate said lower end of said lower mast assembly, said lower slide bars being moveable between an engaged position and a disengaged position, said lower slide bars being received by said lower latch straps when in said engaged position, and said lower slide bars being biased in said engaged position to retain said lower mast assembly in said upright position; and, a lower release bar connected to said lower slide bars, said lower release bar being moveable to position said lower slide bars in said disengaged position to release said lower mast assembly into said collapsed position.

15. The cart of claim 14, wherein said upper locking mechanism comprises:
a pair of opposed upper latch straps connected to said first and second upright frame members of said upper mast assembly proximate said lower end of said upper mast assembly;
a pair of opposed upper slide bars moveably connected to said first and second upright frame members of said lower mast assembly proximate said upper end of said lower mast assembly, said upper slide bars being moveable between an engaged position and a disengaged position, said upper slide bars being received by said upper latch straps when in said engaged position, and said upper slide bars being biased in said engaged position to retain said upper mast assembly in said upright position; and,
an upper release bar connected to said upper slide bars, said upper release bar being moveable to position said upper slide bars in said disengaged position to release said lower mast assembly into said collapsed position.

16. The cart of claim 15, further comprising:
a first bin configured to be supported by said first pair of support arms when in said unfolded position; and,
a second bin configure to be supported by said second pair of support arms when in said unfolded position.

17. The cart of claim 16, wherein:
each support arm of said first pair of support arms and said second pair of support arms comprises a first end pivotably connected to said upper mast assembly, a second end opposite said first end, and an upwardly projecting hook proximate said second end; and,
said first bin and said second bin each comprises a plurality of sidewalls defining an internal volume, an upper perimeter edge, a lip extending around at least part of said upper perimeter edge, and a pair of opposed lip apertures disposed through said lip, said lip being configured to receive said support arm, and said lip aperture being configured to receive said hook.

\* \* \* \* \*